United States Patent
Yagasaki (10) Patent No.: US 11,662,020 B2
(45) Date of Patent: May 30, 2023

(54) CONTINUOUSLY VARIABLE TRANSMISSION

(71) Applicant: Honda Motor Co., Ltd., Tokyo (JP)

(72) Inventor: Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 17/468,618

(22) Filed: Sep. 7, 2021

(65) Prior Publication Data
US 2022/0074492 A1   Mar. 10, 2022

(30) Foreign Application Priority Data
Sep. 9, 2020   (JP) ............................. JP2020-151445

(51) Int. Cl.
*F16H 55/56*    (2006.01)
*F16H 61/662*   (2006.01)
*F16H 57/04*    (2010.01)

(52) U.S. Cl.
CPC ....... *F16H 61/66272* (2013.01); *F16H 55/56* (2013.01); *F16H 57/0434* (2013.01); *F16H 2061/66277* (2013.01); *F16H 2061/66295* (2013.01)

(58) Field of Classification Search
CPC ............... F16H 61/66272; F16H 55/56; F16H 57/0434; F16H 2061/66277; F16H 2061/66295
USPC ......................................................... 474/28
See application file for complete search history.

(56) References Cited

U.S. PATENT DOCUMENTS

| | | | | |
|---|---|---|---|---|
| 4,612,003 A | * | 9/1986 | Ohzono | ............... F16H 61/662 474/28 |
| 6,336,878 B1 | * | 1/2002 | Ehrlich | ................. F16H 63/065 474/18 |
| 6,361,456 B1 | * | 3/2002 | Walter | .................... F16H 55/56 474/18 |

(Continued)

FOREIGN PATENT DOCUMENTS

| | | |
|---|---|---|
| JP | H10252850 | 9/1998 |
| JP | 2004144231 | 5/2004 |

(Continued)

OTHER PUBLICATIONS

"Office Action of Japan Counterpart Application" with English translation thereof, dated Aug. 2, 2022, p. 1-p. 10.

(Continued)

*Primary Examiner* — Gene O Crawford
*Assistant Examiner* — Emily R Kincaid
(74) *Attorney, Agent, or Firm* — JCIPRNET (57) ABSTRACT

A continuously variable transmission changes a gear ratio by changing a groove width between the fixed side pulley half body and the movable side pulley half body in each of the driving pulley and the driven pulley using pulley pressure. At least any of a drive shaft of the driving pulley and a driven shaft of the driven pulley includes a pulley pressure supply oil passage for supplying pulley pressure to the movable side pulley half body, a lubricating oil passage provided on a downstream of the pulley pressure supply oil passage to supply oil as a lubricating oil to an endless member, and a flow control valve that is provided between the pulley pressure supply oil passage and the lubricating oil passage and operates according to pulley pressure.

4 Claims, 7 Drawing Sheets

(56) References Cited

U.S. PATENT DOCUMENTS

| | | | | |
|---|---|---|---|---|
| 2011/0118066 A1* | 5/2011 | Fujimura | ................ | F16H 61/12 |
| | | | | 474/28 |
| 2014/0128188 A1* | 5/2014 | Ouchida | ................ | F16H 61/00 |
| | | | | 474/28 |
| 2015/0330417 A1* | 11/2015 | Kurihara | ................ | F15B 15/14 |
| | | | | 92/170.1 |

FOREIGN PATENT DOCUMENTS

| | | |
|---|---|---|
| JP | 2007113725 | 5/2007 |
| JP | 3938897 | 6/2007 |
| JP | 2008510938 | 4/2008 |
| JP | 2009097624 | 5/2009 |
| JP | 2010270773 | 12/2010 |
| JP | 2012229817 | 11/2012 |
| JP | 2013204803 | 10/2013 |
| JP | 2015048726 | 3/2015 |

OTHER PUBLICATIONS

Office Action of China Counterpart Application, with English translation thereof, dated Feb. 23, 2023, pp. 1-13.

* cited by examiner

FIG.7

CONTINUOUSLY VARIABLE TRANSMISSION

CROSS-REFERENCE TO RELATED APPLICATION

This application claims the priority benefit of Japan application serial no. 2020-151445, filed on Sep. 9, 2020. The entirety of the above-mentioned patent application is hereby incorporated by reference herein and made a part of this specification.

BACKGROUND

Technical Field

The present disclosure relates to a continuously variable transmission.

Description of Related Art

A continuously variable transmission using an endless member is known. Oil functioning as a lubricant is supplied to the endless member of such a continuously variable transmission when necessary. In the continuously variable transmission disclosed in Patent Document 1, for example, a required flow rate of a lubricant to be supplied to the endless member is calculated based on a torque input to the continuously variable transmission, the rotational speed of a driving pulley, and a pulley ratio, and a discharge flow rate of an oil pump is set to realize the calculated required flow rate.

PATENT DOCUMENTS

[Patent Document 1] Japanese Patent No. 3938897

However, in the above-described continuously variable transmission, an oil passage through which oil to be supplied to the endless member circulates is constituted by an oil passage through which oil for operating the driving pulley and the driven pulley is distributed and an oil passage of a divided separate system. For this reason, if a flow rate or pressure of oil toward the pulley side increases, there is concern that the oil will be preferentially supplied to the pulley side and the flow rate or pressure of the oil toward the endless member side will decrease.

Thus, in order to compensate for the decrease in the flow rate or pressure of oil toward the endless member side, for example, increasing the size of the oil pump or increasing the amount of oil is conceivable. However, in such a case, problems such as deterioration of fuel efficiency and an increase in size of the continuously variable transmission may arise.

SUMMARY

The present disclosure provides a simple configuration that enables decrease in a flow rate or pressure of oil toward an endless member to be curbed even when a flow rate or pressure of oil toward the pulley side increases.

A continuously variable transmission (100) according to an aspect of the disclosure is a continuously variable transmission (100) including a driving pulley (30), a driven pulley (31), and an endless member (32) wound around the driving pulley (30) and the driven pulley (31), each of the driving pulley (30) and the driven pulley (31) having a shaft (33, 36), a fixed side pulley half body (34, 37) fixed to the shaft (33, 36), and a movable side pulley half body (35, 38) that can move forward and backward with respect to the fixed side pulley half body (34, 37) in the extending direction of the shaft (33, 36), and a gear ratio being changed by using pulley pressure in each of the driving pulley (30) and the driven pulley (31) to change a groove width between the fixed side pulley half body (34, 37) and the movable side pulley half body (35, 38), and at least any of the shaft (33) of the driving pulley (30) and the shaft (36) of the driven pulley (31) including a pulley pressure supply oil passage (40, 45) for supplying the pulley pressure to the movable side pulley half body (35, 38), a lubricating oil passage (42, 47) provided on a downstream of the pulley pressure supply oil passage (40, 45) to supply oil as a lubricating oil to the endless member (32), and a flow control valve (43, 48) that is provided between the pulley pressure supply oil passage (40, 45) and the lubricating oil passage (42, 47) and operates according to pulley pressure.

According to the continuously variable transmission (100), oil supplying pulley pressure for operating the movable side pulley half body (35, 38) circulates in the pulley pressure supply oil passage (40, 45) in at least any of the shaft (33) of the driving pulley (30) and the shaft (36) of the driven pulley (31). The oil circulating in the pulley pressure supply oil passage (40, 45) is supplied as a lubricating oil to the endless member (32) via the flow control valve (43, 48) that operates according to the pulley pressure on the downstream side. In other words, in the continuously variable transmission (100), the oil passage in which oil to be supplied to the endless member (32) circulates is provided on the downstream side of the oil passage in which oil for causing the driving pulley (30) and the driven pulley (31) to operate circulates (i.e., configured with an oil passage of the same system), and is not configured with an oil passage of a separate system. For this reason, when the flow rate or pressure of oil to the pulley side increases, the flow rate or pressure of oil to the endless member (32) side can simultaneously increase. Therefore, the continuously variable transmission (100) with a simple configuration can curb decrease in a flow rate or pressure of oil toward the endless member (32) even when a flow rate or pressure of oil toward the pulley side increases.

In the continuously variable transmission (100) according to an aspect of the disclosure, when the pulley pressure of the driving pulley (30) or the driven pulley (31) provided with the flow control valve (43, 48) reaches a preset specified pulley pressure, the flow control valve (43, 48) may emit oil supplied to the movable side pulley half body (35, 38). According to this configuration, it is possible to prevent an overshoot phenomenon in which the pulley pressure becomes excessively high from occurring even when a shift speed increases, for example. As a result, it is possible to stop insufficient supply of the lubricating oil to the endless member (32) caused by the overshoot phenomenon and excessive mechanical input to a constituent member of the continuously variable transmission (100).

In the continuously variable transmission (100) according to an aspect of the disclosure, the lubricating oil passage (42, 47) may have a supply port (N1, N2) formed to supply oil to the endless member (32) from the lubricating oil passage (42, 47), and the supply port (N1, N2) may be closed by the movable side pulley half body (35, 38) of the driving pulley (30) or the driven pulley (31) when the winding diameter of the endless member (32) with respect to the driving pulley (30) or the driven pulley (31) is greater than a preset specified winding diameter. Generally, when the winding diameter of the endless member (32) around the pulley is small, a required flow rate of the lubricating oil to the endless member (32) is more likely to increase than when the winding diameter of the endless member (32) around the pulley is large. In addition, when the winding diameter of the endless member (32) around the pulley is large, the endless member (32) moves away from the supply port (N1, N2) of the lubricating oil passage (42, 47) provided in the shaft (33, 36) of the pulley, thus the lubricating oil is less likely to reach the endless member (32) from the supply port (N1, N2), and thus the efficiency in supply of the lubricating oil deteriorates. For this reason, in the continuously variable transmission (100), the supply port (N1, N2) is opened to supply the lubricating oil to the endless member (32) when the winding diameter of the endless member (32) around the pulley is smaller than the preset specified winding diameter, and the supply port (N1, N2) is closed to reduce the usage amount of the lubricating oil when the winding diameter of the endless member (32) around the pulley is greater than the preset specified winding diameter. In addition, the continuously variable transmission (100) can have a simpler structure because the supply port (N1, N2) is opened and closed using the existing movable side pulley half body (35, 38) without adding a new constituent component, and further increase in size and cost of the apparatus can be curbed.

Further, the reference numerals in the parenthesis are examples of the reference numerals of the constituent elements of the embodiment of the disclosure to be described below, and the disclosure is not limited to the aspects of the embodiment.

As described above, the continuously variable transmission according to the present disclosure provides a simple configuration that enables a decrease in a flow rate or pressure of oil toward the endless member to be curbed even when a flow rate or pressure of oil toward the pulley side increases.

DESCRIPTION OF THE EMBODIMENTS

Next, illustrative embodiments of the disclosure will be described with reference to the drawings. Further, the same reference numerals are given to the same or equivalent parts, and overlapping description thereof is omitted.

[Configuration of Continuously Variable Transmission]

Figure 1:
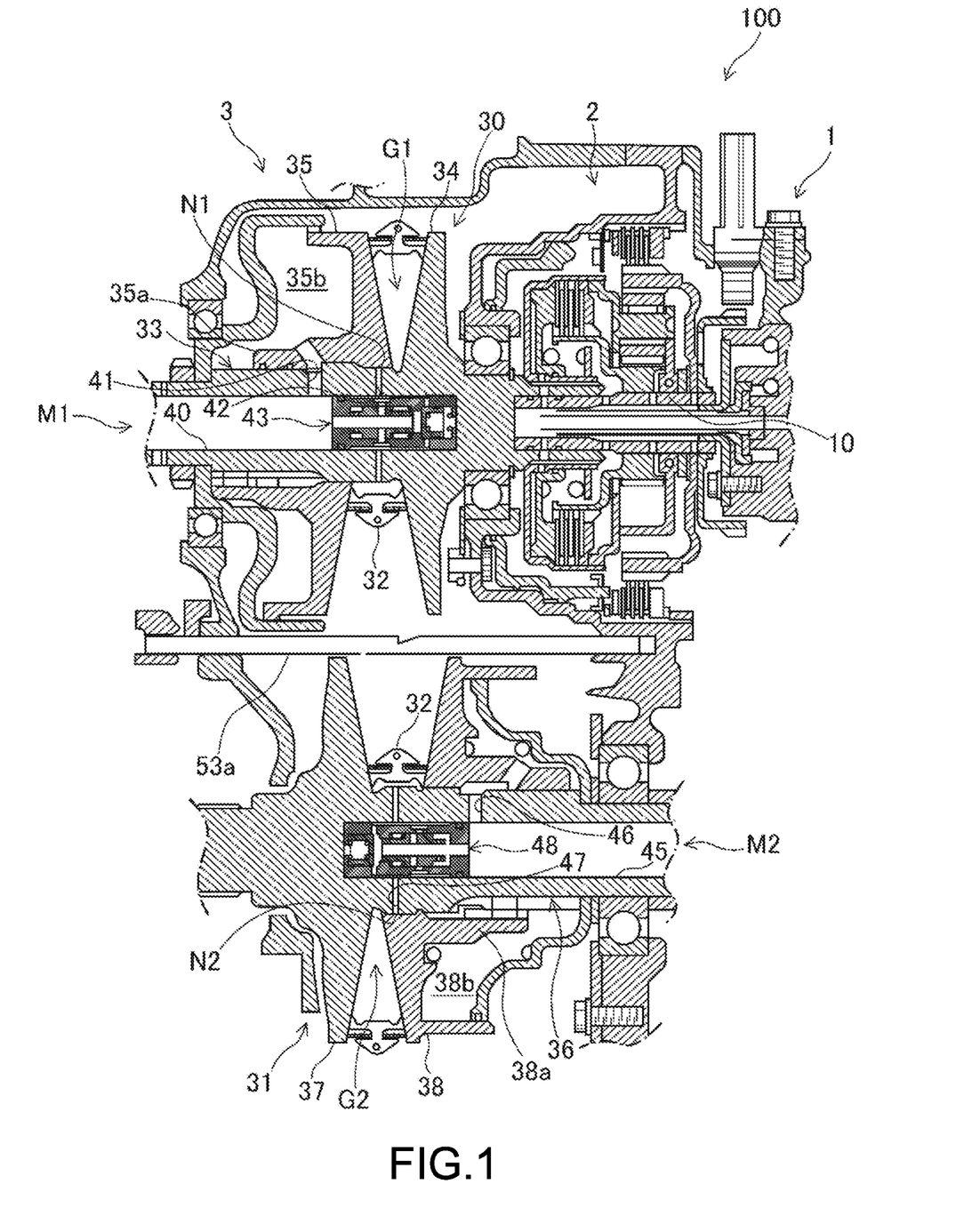
FIG. 1 is a cross-sectional view illustrating a part of a continuously variable transmission according to the present embodiment.
Figure 2:
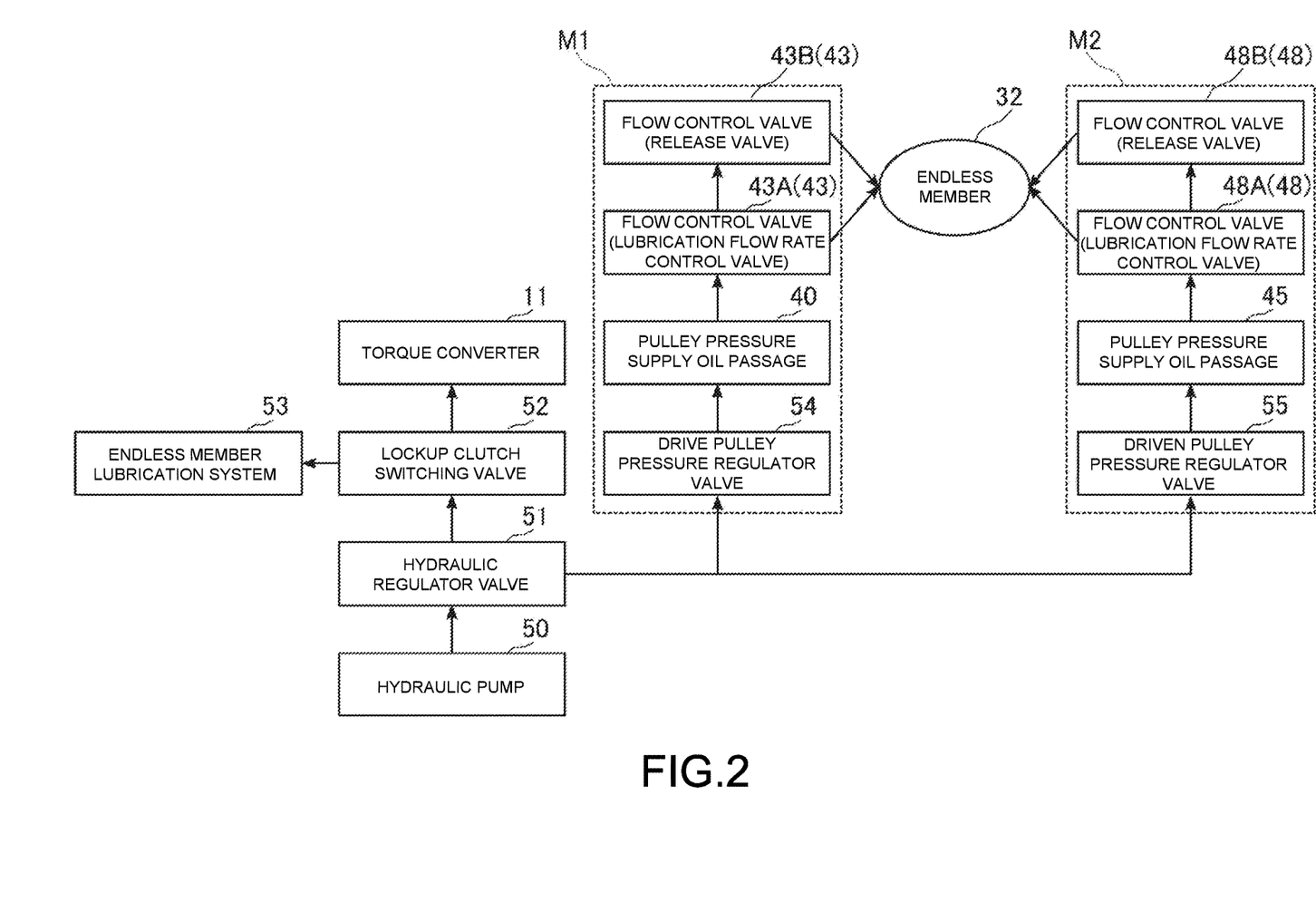
FIG. 2 is a block diagram illustrating a lubrication circuit of the continuously variable transmission.

FIG. 1 is a cross-sectional view illustrating a part of a continuously variable transmission 100 according to the present embodiment. FIG. 2 is a block diagram illustrating a lubrication circuit of the continuously variable transmission 100. The continuously variable transmission 100 is a belt-type continuously variable transmission (CVT) with a pulley structure and can change (i.e., can shift) a gear ratio continuously, as illustrated in FIGS. 1 and 2. The continuously variable transmission 100 is an automatic transmission mounted in a vehicle, for example, a passenger car, and can shift a drive force input from a drive source (not illustrated) side continuously and output the force to a drive wheel (not illustrated) side. Here, although the drive source is assumed to be an engine, it is not necessarily limited to an engine. The continuously variable transmission 100 includes a drive force input mechanism 1, a forward/backward switching mechanism 2, a belt-type continuously variable transmission mechanism 3, and a drive force output mechanism (not illustrated).

The drive force input mechanism 1 is a mechanism that transmits a drive force input from the drive source to the forward/backward switching mechanism 2. The drive force input mechanism 1 includes an input shaft 10 and a torque converter 11. The input shaft 10 is a shaft that transmits the drive force input from the drive source via a crank shaft, or the like. The torque converter 11 is a drive force transmission mechanism using oil and has a pump impeller, a stator, and a turbine runner. The pump impeller is fixed to the input shaft 10 and rotates along with the input shaft 10. Oil with circulating flow generated due to a rotation of the pump impeller is rectified by the stator and drives the turbine runner.

The forward/backward switching mechanism 2 is a mechanism that rotates the drive force transmitted from the turbine runner of the torque converter 11 forward or backward and transmits the drive force to the belt-type continuously variable transmission mechanism 3. The forward/backward switching mechanism 2 is constituted by a planetary gear disposed coaxially with the input shaft 10, a clutch mechanism, a brake mechanism, and the like.

The belt-type continuously variable transmission mechanism 3 is a mechanism that shifts the drive force transmitted from the forward/backward switching mechanism 2 continuously with the pulley structure. The belt-type continuously variable transmission mechanism 3 receives supply of oil discharged from, for example, a hydraulic pump 50 driven by the drive source. The belt-type continuously variable transmission mechanism 3 has an oil passage in which oil supplied from the hydraulic pump 50 circulates. The belt-type continuously variable transmission mechanism 3 includes a driving pulley 30, a driven pulley 31, an endless member 32, and a hydraulic actuator mechanism.

The driving pulley 30 is a pulley mechanism that rotates and is driven by a drive force transmitted from the forward/backward switching mechanism 2. The driving pulley 30 transmits the drive force to the wound endless member 32. The driving pulley 30 has a drive shaft (shaft) 33, a fixed side pulley half body 34, and a movable side pulley half body 35.

The drive shaft 33 is a shaft that holds the fixed side pulley half body 34 and the movable side pulley half body 35 and is rotatable around the axis. The drive shaft 33 is disposed coaxially with the input shaft 10. A part of an outer circumferential surface of the drive shaft 33 (a portion corresponding to a flange 35a of the movable side pulley half body 35 which will be described below) has an outer diameter spline formed in the axial direction. In addition, the drive shaft 33 is provided with an oil supply mechanism M1 (which will be described below in more detail).

The fixed side pulley half body 34 is a member that is disposed coaxially with and facing the movable side pulley half body 35 and sandwiches the endless member 32 in cooperation with the movable side pulley half body 35. The fixed side pulley half body 34 has substantially a disc shape in which the diameter of the surface thereof on the movable side pulley half body 35 side reduces toward the movable side pulley half body 35. The fixed side pulley half body 34 is fixed to the drive shaft 33 (e.g., formed to be integrated with the drive shaft 33). In other words, the fixed side pulley half body 34 is not capable of rotating with respect to the drive shaft 33 and not capable of moving in the axis direction.

The movable side pulley half body 35 is a member that is disposed coaxially with and facing the fixed side pulley half body 34 and sandwiches the endless member 32 in cooperation with the fixed side pulley half body 34. The movable side pulley half body 35 has substantially a disc shape in which the diameter of the surface thereof on the fixed side pulley half body 34 side reduces toward the fixed side pulley half body 34. The movable side pulley half body 35 includes the barrel-shaped flange 35a extending along the drive shaft 33 so as to surround the drive shaft 33 on the surface opposite to the fixed side pulley half body 34. An inner diameter spline is formed on an inner circumferential surface of the flange 35a in the axial direction, and the flange 35a is spline-fitted to the drive shaft 33. Thus, the movable side pulley half body 35 is not capable of rotating with respect to the drive shaft 33 but is capable of moving in the axis direction. In other words, the movable side pulley half body 35 can move forward and backward with respect to the fixed side pulley half body 34 in the direction in which the drive shaft 33 extends. The movable side pulley half body 35 includes a hydraulic chamber 35b on the side opposite to the fixed side pulley half body 34.

A sandwiching groove G1 having a V-shaped cross-section in which the endless member 32 is sandwiched is formed between the fixed side pulley half body 34 and the movable side pulley half body 35. A width of the sandwiching groove G1 is changed as the movable side pulley half body 35 moves forward and backward with respect to the fixed side pulley half body 34 in the direction in which the drive shaft 33 extends. In other words, by moving the movable side pulley half body 35 forward and backward in the driving pulley 30, the width of the sandwiching groove G1 between the fixed side pulley half body 34 and the movable side pulley half body 35 can be changed. A winding diameter of the endless member 32 with respect to the fixed side pulley half body 34 and the movable side pulley half body 35 (i.e., the driving pulley 30) is larger when the width of the sandwiching groove G1 is narrow than when the width of the sandwiching groove G1 is wide.

The driven pulley 31 is a pulley mechanism driven by a drive force transmitted from the driving pulley 30 to the endless member 32. The driven pulley 31 transmits the drive force transmitted from the endless member 32 to the drive force output mechanism. The driven pulley 31 has a driven shaft (shaft) 36, a fixed side pulley half body 37, and a movable side pulley half body 38.

The driven shaft 36 is a shaft that holds the fixed side pulley half body 37 and the movable side pulley half body 38 and is rotatable around the axis. The driven shaft 36 is disposed parallel to the drive shaft 33. A part of an outer circumferential surface of the driven shaft 36 (a portion corresponding to a flange 38a of the movable side pulley half body 38 which will be described below) has an outer diameter spline formed in the axial direction. In addition, the driven shaft 36 is provided with an oil supply mechanism M2 (which will be described below in more detail).

The fixed side pulley half body 37 is a member that is disposed coaxially with and facing the movable side pulley half body 38 and sandwiches the endless member 32 in cooperation with the movable side pulley half body 38. The fixed side pulley half body 37 has substantially a disc shape in which the diameter of the surface thereof on the movable side pulley half body 38 side reduces toward the movable side pulley half body 38. The fixed side pulley half body 37 is fixed to the driven shaft 36 (e.g., formed to be integrated with the driven shaft 36). In other words, the fixed side pulley half body 37 is not capable of rotating with respect to the driven shaft 36 and not capable of moving in the axis direction.

The movable side pulley half body 38 is a member that is disposed coaxially with and facing the fixed side pulley half body 37 and sandwiches the endless member 32 in cooperation with the fixed side pulley half body 37. The movable side pulley half body 38 has a substantially disc shape in which the diameter of the surface thereof on the fixed side pulley half body 37 side reduces toward the fixed side pulley half body 37. The movable side pulley half body 38 includes the barrel-shaped flange 38a extending along the driven shaft 36 so as to surround the driven shaft 36 on the surface opposite to the fixed side pulley half body 37. An inner diameter spline is formed on an inner circumferential surface of the flange 38a in the axial direction, and the flange 38a is spline-fitted to the driven shaft 36. Thus, the movable side pulley half body 38 is not capable of rotating with respect to the driven shaft 36 but is capable of moving in the axis direction. In other words, the movable side pulley half body 38 can move forward and backward with respect to the fixed side pulley half body 37 in the direction in which the driven shaft 36 extends. The movable side pulley half body 38 includes a hydraulic chamber 38b on the side opposite to the fixed side pulley half body 37.

A sandwiching groove G2 having a V-shaped cross-section in which the endless member 32 is sandwiched is formed between the fixed side pulley half body 37 and the movable side pulley half body 38. A width of the sandwiching groove G2 changes as the movable side pulley half body 38 moves forward and backward with respect to the fixed side pulley half body 37 in the direction in which the driven shaft 36 extends. In other words, by moving the movable side pulley half body 38 forward and backward in the driven pulley 31, the width of the sandwiching groove G2 between the fixed side pulley half body 37 and the movable side pulley half body 38 can be changed. A winding diameter of the endless member 32 with respect to the fixed side pulley half body 37 and the movable side pulley half body 38 (i.e., the driven pulley 31) is larger when the width of the sandwiching groove G2 is narrow than when the width of the sandwiching groove G2 is wide.

The hydraulic actuator mechanism is a mechanism that adjusts the pressure of the oil discharged from the hydraulic pump 50 and supplies the pressure as pulley pressure to the movable side pulley half bodies 35 and 38. The hydraulic actuator mechanism supplies the pulley pressure to the hydraulic chambers 35b and 38b of the movable side pulley half bodies 35 and 38 via the oil passage of the belt-type continuously variable transmission mechanism 3. The hydraulic actuator mechanism controls the pulley pressure such that the movable side pulley half bodies 35 and 38 are driven (i.e., causes the movable side pulley half body 35 to move forward and backward in the direction in which the drive shaft 33 extends, and causes the movable side pulley half body 38 to move forward and backward in the direction in which the driven shaft 36 extends).

The endless member 32 is a metal belt that transmits a drive force of the driving pulley 30 to the driven pulley 31. The endless member 32 has a ring shape (endless shape) and is wound around the driving pulley 30 and the driven pulley 31. The endless member 32 includes many elements arrayed in the circumferential direction in a superimposing manner on a flexible ring in which thin plates are laminated in the radial direction. The endless member 32 is sandwiched by the fixed side pulley half body 34 and the movable side pulley half body 35 of the driving pulley 30, and sandwiched by the fixed side pulley half body 37 and the movable side pulley half body 38 of the driven pulley 31.

The endless member 32 maintains appropriate tension at all times since the width of the sandwiching groove G1 of the driving pulley 30 and the width of the sandwiching groove G2 of the driven pulley 31 are controlled in coordination with the hydraulic actuator mechanism. In other words, when the width of the sandwiching groove G1 of the driving pulley 30 becomes narrow, the width of the sandwiching groove G2 of the driven pulley 31 becomes wide. In this case, the winding diameter of the endless member 32 with respect to the driving pulley 30 becomes larger and the winding diameter of the endless member 32 with respect to the driven pulley 31 becomes smaller, and as a result, a gear ratio of the continuously variable transmission 100 is changed to a low speed side (LOW side). Conversely, when the width of the sandwiching groove G1 of the driving pulley 30 becomes wide, the width of the sandwiching groove G2 of the driven pulley 31 becomes narrow. In this case, the winding diameter of the endless member 32 with respect to the driving pulley 30 becomes smaller and the winding diameter of the endless member 32 with respect to the driven pulley 31 becomes larger, and as a result, a gear ratio of the continuously variable transmission 100 is changed to a high speed side (OD side). In other words, in the driving pulley 30 and the driven pulley 31, the widths of the sandwiching grooves G1 and G2 between the fixed side pulley half bodies 34 and 37 and the movable side pulley half bodies 35 and 38 are changed due to pulley pressures, and as a result, the gear ratio of the continuously variable transmission 100 is changed according to the winding diameters of the endless member 32 with respect to the driving pulley 30 and the driven pulley 31. Further, in FIG. 1, both the endless member 32 (and the movable side pulley half bodies 35 and 38) at a gear ratio of the continuously variable transmission 100 on a low speed side and the endless member 32 (and the movable side pulley half bodies 35 and 38) at a gear ratio of the continuously variable transmission 100 on a high speed side are illustrated for convenience.

The drive force output mechanism is a mechanism that outputs a drive force transmitted from the driven pulley 31 of the belt-type continuously variable transmission mechanism 3 to the drive wheel side. The drive force output mechanism includes a differential device (not illustrated). Specifically, the differential device has a driven gear formed in the driven shaft 36 that meshes with a drive gear to transmit a drive force from the driven pulley 31. The differential device distributes and transmits the drive force transmitted from the driven pulley 31 to left and right drive shafts (not illustrated).

[Lubrication Circuit]

An overall configuration of the lubrication circuit of the continuously variable transmission 100 will be described. Oil discharged from the hydraulic pump 50 is supplied to the hydraulic regulator valve 51 and pressure thereof is adjusted to line pressure as illustrated in FIG. 2. The hydraulic regulator valve 51 splits the pressure-adjusted oil to a first hydraulic system that controls a lockup clutch of the torque converter 11 and a second hydraulic system that controls the driving pulley 30 and the driven pulley 31.

Some of the oil split to the first hydraulic system is supplied to the torque converter 11 by a lockup clutch switching valve 52 to be used in performing and stopping lockup control. In addition, the rest of the oil split to the first hydraulic system is supplied to an endless member lubricating system 53 to lubricate the endless member 32. Specifically, the oil is sprayed from a tube 53a disposed between the driving pulley 30 and the driven pulley 31 toward the endless member 32 to be used as a lubricating oil of the endless member 32. On the other hand, some of the oil split to the second hydraulic system is supplied to an oil supply mechanism M1 of the drive shaft 33, which will be described below. In addition, the rest of the oil split to the second hydraulic system is supplied to an oil supply mechanism M2 of the driven shaft 36, which will be described below.

[Oil Supply Mechanism of Drive Shaft]

The oil supply mechanism M1 provided in the drive shaft 33 of the driving pulley 30 will be described.

Figure 3:
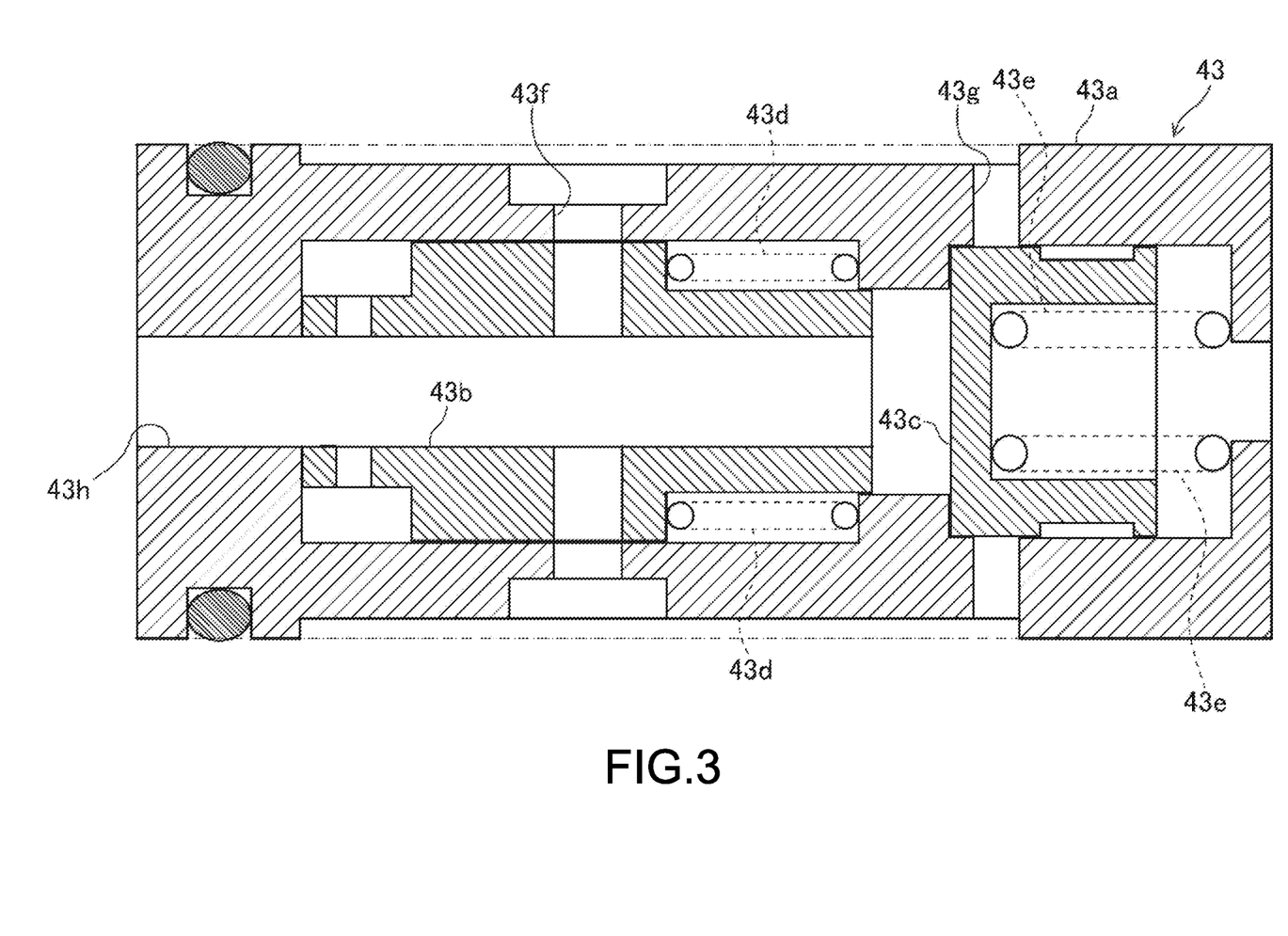
FIG. 3 is a cross-sectional view illustrating a flow control valve provided in a driving pulley when pulley pressure is low.
Figure 4:
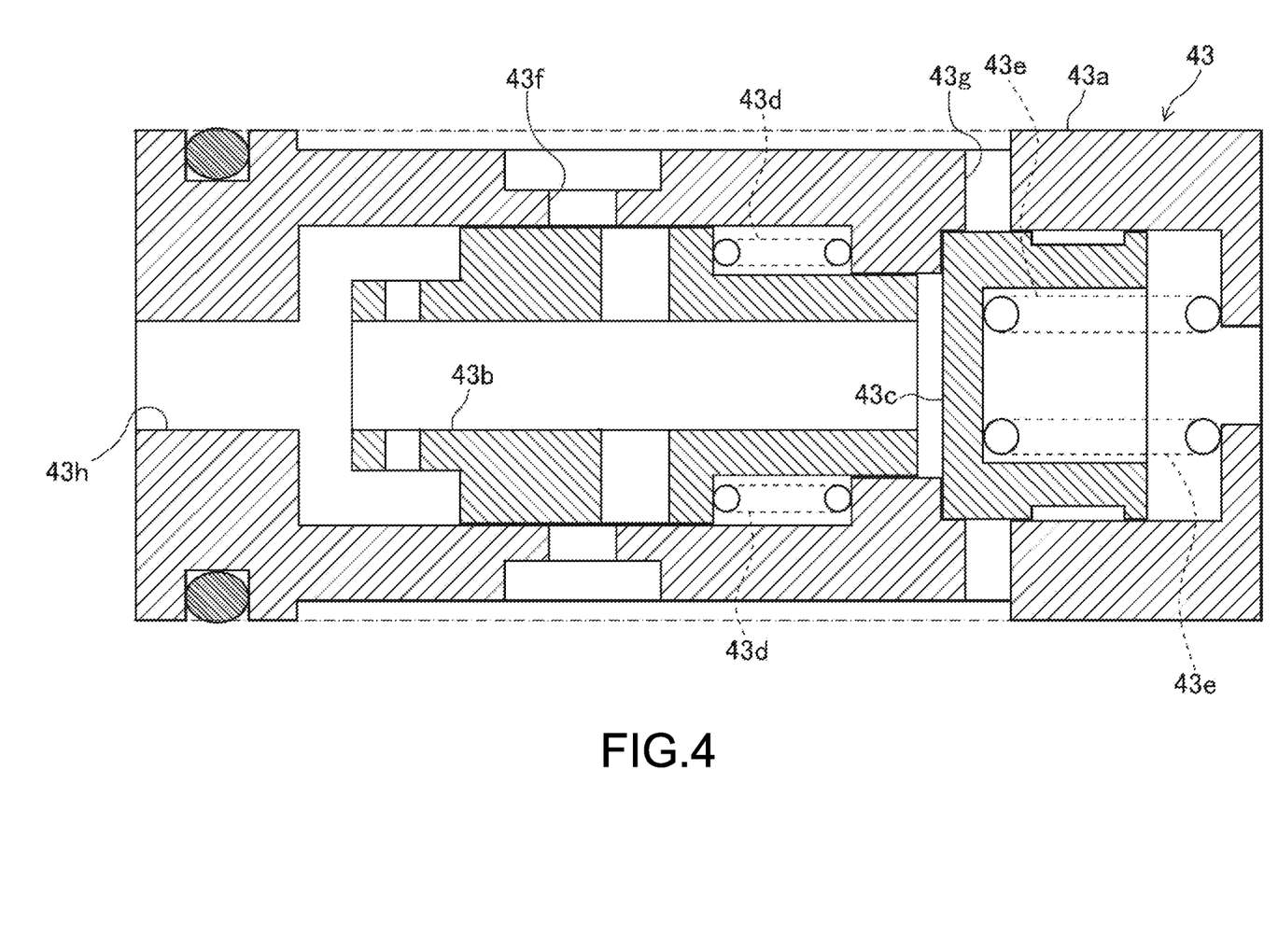
FIG. 4 is a cross-sectional view illustrating the flow control valve provided in the driving pulley when pulley pressure is intermediate.
Figure 5:
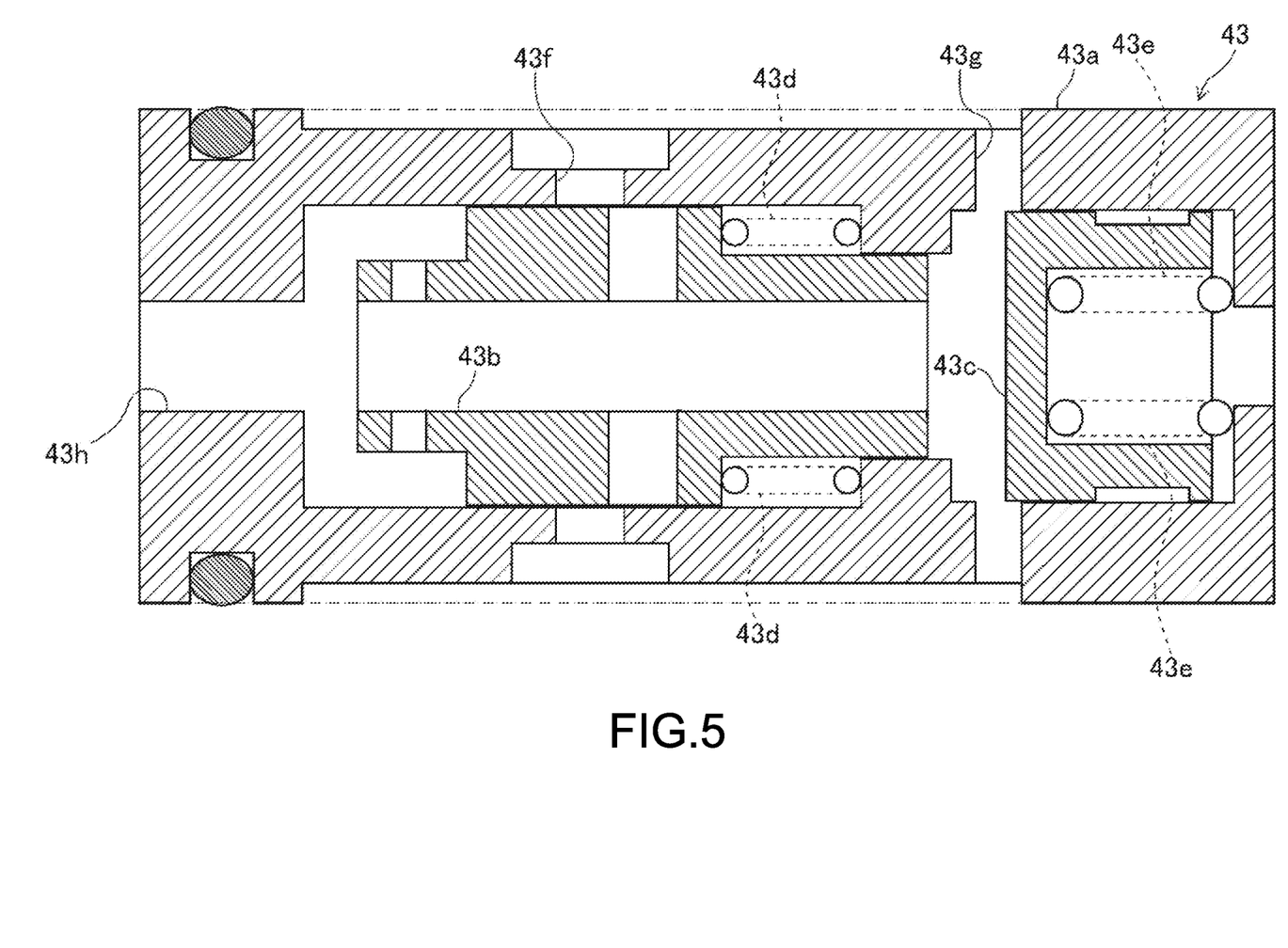
FIG. 5 is a cross-sectional view illustrating the flow control valve provided in the driving pulley when pulley pressure is high.

FIG. 3 is a cross-sectional view illustrating a flow control valve 43 provided in the driving pulley 30 when pulley pressure is low. FIG. 4 is a cross-sectional view illustrating the flow control valve 43 provided in the driving pulley 30 when pulley pressure is intermediate. FIG. 5 is a cross-sectional view illustrating the flow control valve 43 provided in the driving pulley 30 when pulley pressure is high. The oil supply mechanism M1 is a mechanism that supplies oil to transmit pulley pressure to the hydraulic chamber 35b of the movable side pulley half body 35 and supplies oil as a lubricating oil to the endless member 32, as illustrated in FIGS. 1 to 5. The oil supply mechanism M1 includes a pulley pressure supply oil passage 40, a pulley connection oil passage 41, a lubricating oil passage 42, and a flow control valve 43.

The pulley pressure supply oil passage 40 is an oil passage for supplying pulley pressure to the hydraulic chamber 35b of the movable side pulley half body 35 and an oil passage for allowing oil as a lubricating oil to be supplied to the endless member 32 to circulate. Here, the drive shaft 33 has a hollow structure with one open end. Specifically, the drive shaft 33 has a bottomed hole from an opening provided at the center of the end surface of one end thereof in the axial direction toward the other end side in the axial direction, and the hole functions as the pulley pressure supply oil passage 40. The pulley pressure supply oil passage 40 receives supply of oil discharged from the hydraulic pump 50 with pressure adjusted by a driving pulley pressure regulator valve 54 of the hydraulic actuator mechanism.

The pulley connection oil passage 41 is an oil passage for supplying pulley pressure to the hydraulic chamber 35b of the movable side pulley half body 35. The pulley connection oil passage 41 is a through hole formed to communicate with a midway position of the pulley pressure supply oil passage 40 (a position on an upstream side of the flow control valve 43) and an outer side surface of the drive shaft 33. In addition, the pulley connection oil passage 41 communicates with the hydraulic chamber 35b of the movable side pulley half body 35 via an oil passage formed at the flange 35a of the movable side pulley half body 35. Thus, the pulley pressure is supplied to the hydraulic chamber 35b via the pulley connection oil passage 41.

The lubricating oil passage 42 is an oil passage provided on a downstream of the pulley pressure supply oil passage 40 to supply oil as a lubricating oil to the endless member 32. The lubricating oil passage 42 is a through hole formed to communicate with the pulley pressure supply oil passage 40 and an outer side surface of the drive shaft 33. The lubricating oil passage 42 communicates with a first port 43f and a second port 43g of the flow control valve 43 which will be described below.

The lubricating oil passage 42 has a supply port N1 formed to be open on an outer side surface of the drive shaft 33. The supply port N1 is formed at a position at which, when the movable side pulley half body 35 moves forward or backward from the fixed side pulley half body 34 in the extending direction of the drive shaft 33, the supply port is covered by the movable side pulley half body 35 if movable side pulley half body 35 is away from the fixed side pulley half body 34 by less than a preset distance and is not covered by the movable side pulley half body 35 (i.e., is exposed) if the movable side pulley half body 35 is away from the fixed side pulley half body 34 by the preset distance or longer. In other words, the supply port N1 that supplies oil from the lubricating oil passage 42 to the endless member 32 is formed at the lubricating oil passage 42, and the supply port N1 is closed by the movable side pulley half body 35 when a winding diameter of the endless member 32 with respect to the driving pulley 30 is greater than a preset specified winding diameter (a winding diameter when the movable side pulley half body 35 is away from the fixed side pulley half body 34 by the preset distance). Further, the supply port N1 may be covered by the movable side pulley half body 35 when a winding diameter of the endless member 32 with respect to the driving pulley 30 is maximum. Because the supply port N1 of the lubricating oil passage 42 is formed in the drive shaft 33, oil supplied to the endless member 32 via the supply port N1 is sprayed mainly toward an inner circumferential surface side of the endless member 32.

The flow control valve 43 is a valve provided between the pulley pressure supply oil passage 40 and the lubricating oil passage 42 and operates according to pulley pressure. The flow control valve 43 controls a flow rate (lubrication flow rate) of oil supplied as a lubricating oil to the endless member 32 according to pulley pressure. The flow control valve 43 has a function as a lubrication flow rate control valve 43A that operates when pulley pressure of the driving pulley 30 is lower than preset specified pulley pressure and a function as a release valve 43B that operates when pulley pressure of the driving pulley 30 reaches the preset specified pulley pressure (equal to or higher than the specified pulley pressure). The flow control valve 43 includes a case 43a, a first spool 43b, a second spool 43c, first springs 43d, and second springs 43e.

The case 43a is a housing of the flow control valve 43 having substantially a cylindrical shape. In the case 43a, an inflow port 43h from which oil flows in, a first port 43f and a second port 43g from which oil flows out are formed. The inflow port 43h is formed on one end surface of the case 43a in the axial direction.

The first port 43f is formed near the center of the case 43a in the axial direction. The first port 43f is a through hole formed to communicate with a hollow portion inside the case 43a and an outer side surface of the case 43a. The first port 43f communicates with the lubricating oil passage 42 outside the case 43a.

The second port 43g is formed at a position farther from the inflow port 43h of the case 43a in the axial direction than from the first port 43f. The second port 43g is a through hole formed to communicate with a hollow portion inside the case 43a and an outer side surface of the case 43a. The second port 43g communicates with the lubricating oil passage 42 outside the case 43a.

The first spool 43b is a member disposed inside the case 43a and opens and closes the first port 43f according to port pressure. The first spool 43b is biased to the inflow port 43h side by the first springs 43d. When the pulley pressure is low, the first spool 43b causes the first port 43f to be open (e.g., half open or fully open) (FIG. 3). When the pulley pressure increases to medium pressure, the first spool 43b moves to the side opposite to the inflow port 43 against the first springs 43d. Thus, the first spool 43b gradually decreases the opening degree of the first port 43f (FIG. 4). Even when the pulley pressure further increases to high pressure, the first spool 43b stays at the same position as that when the pulley pressure is medium, and maintains the opening degree of the first port 43f constantly (FIG. 5). Further, when the pulley pressure is high, the first spool 43b may move to the side opposite to the inflow port 43h further than when the pulley pressure is medium, and in this case, the first spool 43b causes the first port 43f to be closed (fully closed).

When the first spool 43b is half open or fully open, the oil circulating in the pulley pressure supply oil passage 40 passes through the first port 43f and the lubricating oil passage 42 in order and is supplied to the endless member 32 as a lubricating oil. In this manner, the flow control valve 43 functions as the lubrication flow rate control valve 43A when the pulley pressure of the driving pulley 30 is lower than the preset specified pulley pressure.

The second spool 43c is a member disposed inside the case 43a and opens and closes the second port 43g according to port pressure. The second spool 43c is biased to the inflow port 43h side by the second springs 43e. When the pulley pressure is low or medium, the second spool 43c causes the second port 43g to be closed (e.g., fully closed) (FIGS. 3 and 4). When the pulley pressure is high, the second spool 43c moves to the side opposite to the inflow port 43h against the second springs 43e. Thus, the second spool 43c causes the second port 43g to be open (e.g., half open or fully open) (FIG. 5).

When the second spool 43c is half open or fully open, the oil discharged from the hydraulic pump 50 with pressure adjusted by the hydraulic actuator mechanism and circulating in the pulley pressure supply oil passage 40 passes through the second port 43g and the lubricating oil passage 42 in order and is supplied to the endless member 32 as a lubricating oil. In other words, the second spool 43c emits (releases) the oil supplied to the movable side pulley half body 35 when the pulley pressure of the driving pulley 30 reaches the preset specified pulley pressure (release pressure). Further, the specified pulley pressure may be an upper limit of the pulley pressure (upper limit pulley pressure). In this manner, the flow control valve 43 functions as the release valve 43B when the pulley pressure of the driving pulley 30 reaches the preset specified pulley pressure.

Figure 6:
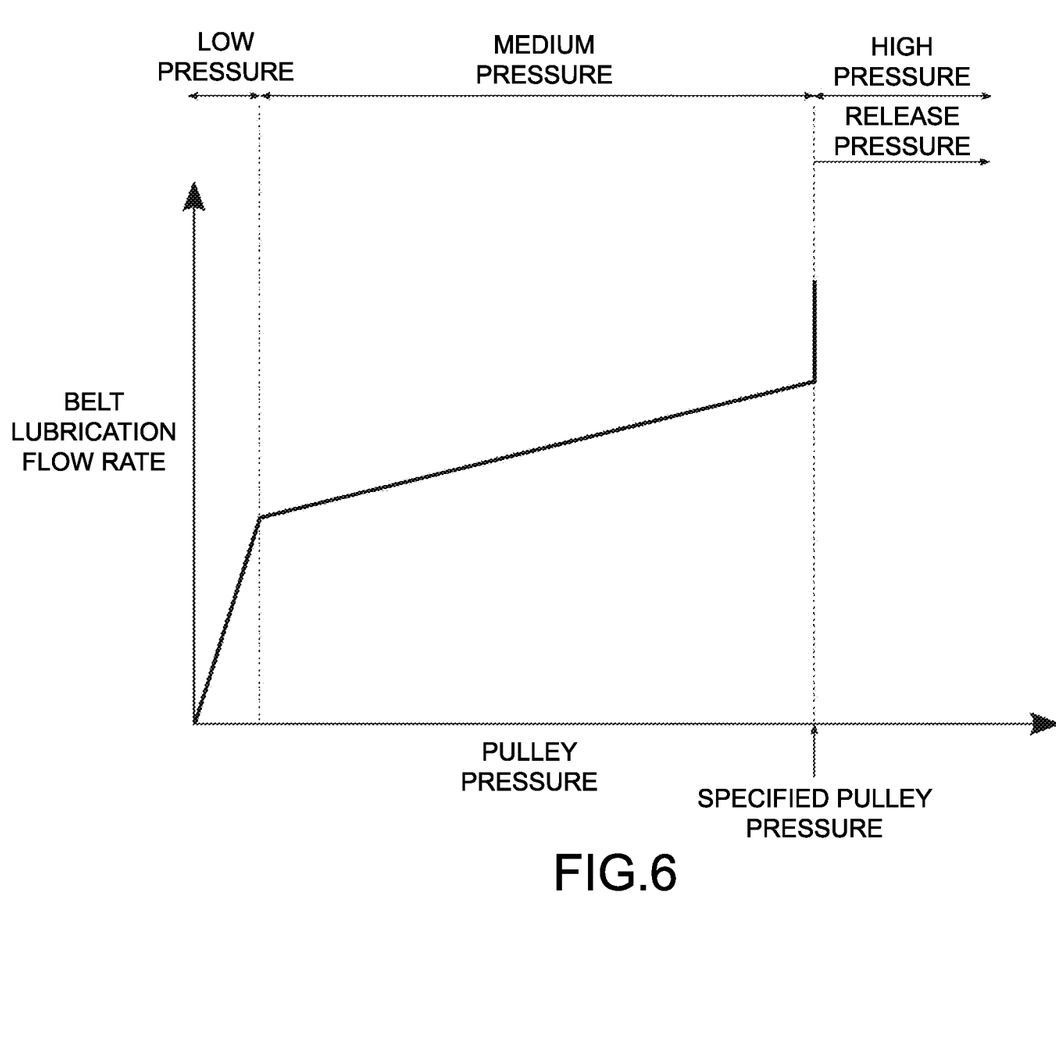
FIG. 6 is a graph showing an example of pressure-flow rate characteristics of the flow control valve.

FIG. 6 is a graph showing an example of pressure-flow rate characteristics of the flow control valve 43. In FIG. 6, the horizontal axis represents pulley pressure and the vertical axis represents a lubrication flow rate of the endless member 32. As shown in FIG. 6, the flow control valve 43 exhibits different pressure-flow rate characteristics when the pulley pressure is low, medium, and high. When the pulley pressure is low, the flow control valve 43 causes the first port 43f to be open, and thus exhibits port characteristics (orifice characteristics) that the lubrication flow rate increases proportional to the pulley pressure. When the pulley pressure is medium, the flow control valve 43 gradually decreases the opening degree of the first port 43f while the pulley pressure increases, and thus the lubrication flow rate is determined in consideration of the influence of the pulley pressure and the influence of the opening degree of the first port 43f. Here, the pressure-flow rate characteristics of the flow control valve 43 are set such that the lubrication flow rate gradually increases as the pulley pressure increases. When the pulley pressure further increases and thus reaches to the preset specified pulley pressure, oil supplied to the movable side pulley half body 35 is emitted and thus the lubrication flow rate sharply increases. The pulley pressure is specified, for example, according to a control map based on a target value of a drive force from the drive source and a target value of a gear ratio.

[Oil Supply Mechanism of Driven Shaft]

Figure 7:
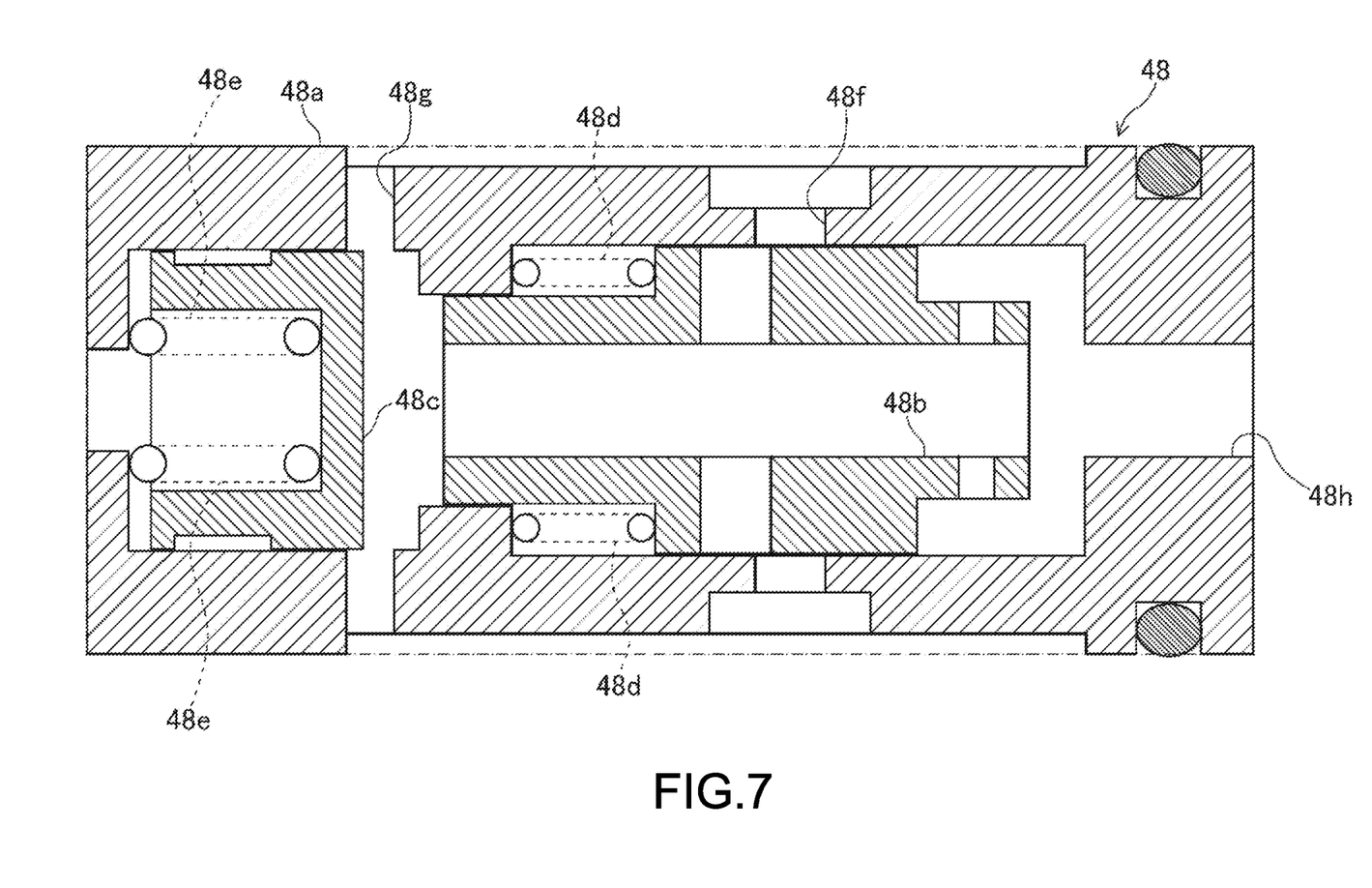
FIG. 7 is a cross-sectional view illustrating a flow control valve provided in a driven pulley.

The oil supply mechanism M2 provided in the driven shaft 36 of the driven pulley 31 will be described. FIG. 7 is a cross-sectional view illustrating a flow control valve 48 provided in the driven pulley 31. The oil supply mechanism M2 is a mechanism that supplies oil to transmit pulley pressure to the hydraulic chamber 38b of the movable side pulley half body 38 and supplies oil as a lubricating oil to the endless member 32, as illustrated in FIGS. 1, 2, and 7. When the oil supply mechanism M2 provided in the driven shaft 36 of the driven pulley 31 is compared with the oil supply mechanism M1 provided in the drive shaft 33 of the driven pulley 30, the major difference is that the inflow port of the flow control valve is formed to the side opposite to that of the oil supply mechanism M1 in the axial direction (e.g., on the second spool side), and other points are similar. The oil supply mechanism M2 includes a pulley pressure supply oil passage 45, a pulley connection oil passage 46, a lubricating oil passage 47, and the flow control valve 48.

The pulley pressure supply oil passage 45 is an oil passage for supplying pulley pressure to the hydraulic chamber 38b of the movable side pulley half body 38 and an oil passage for allowing oil as a lubricating oil to be supplied to the endless member 32 to circulate. Here, the driven shaft 36 has a hollow structure with one open end. Specifically, the driven shaft 36 has a bottomed hole from an opening provided at the center of the end surface of one end thereof in the axial direction toward the other end side in the axial direction, and the hole functions as the pulley pressure supply oil passage 45. The pulley pressure supply oil passage 45 receives supply of oil discharged from the hydraulic pump 50 with pressure adjusted by a driven pulley pressure regulator valve 55 of the hydraulic actuator mechanism.

The pulley connection oil passage 46 is an oil passage for supplying pulley pressure to the hydraulic chamber 38b of the movable side pulley half body 38. The pulley connection oil passage 46 is a through hole formed to communicate with a midway position of the pulley pressure supply oil passage 45 (a position on an upstream side of the flow control valve 48) and an outer side surface of the driven shaft 36. In addition, the pulley connection oil passage 46 communicates with the hydraulic chamber 38b of the movable side pulley half body 38 via an oil passage formed at the flange 38a of the movable side pulley half body 38. Thus, the pulley pressure is supplied to the hydraulic chamber 38b via the pulley connection oil passage 46.

The lubricating oil passage 47 is an oil passage provided on a downstream of the pulley pressure supply oil passage 45 to supply oil as a lubricating oil to the endless member 32. The lubricating oil passage 47 is a through hole formed to communicate with the pulley pressure supply oil passage 45 and an outer side surface of the driven shaft 36. The lubricating oil passage 47 communicates with a first port 48f and a second port 48g of the flow control valve 48 which will be described below.

The lubricating oil passage 47 has a supply port N2 formed to be open on an outer side surface of the driven shaft 36. The supply port N2 is formed at a position at which, when the movable side pulley half body 38 moves forward or backward from the fixed side pulley half body 37 in the extending direction of the driven shaft 36, the supply port is covered by the movable side pulley half body 38 if movable side pulley half body 38 is away from the fixed side pulley half body 37 by less than a preset distance and is not covered by the movable side pulley half body 38 (i.e., is exposed) if the movable side pulley half body 38 is away from the fixed side pulley half body 37 by the preset distance or longer. In other words, the supply port N2 that supplies oil from the lubricating oil passage 47 to the endless member 32 is formed at the lubricating oil passage 47, and the supply port N2 is closed by the movable side pulley half body 38 when a winding diameter of the endless member 32 with respect to the driven pulley 31 is greater than a preset specified winding diameter (a winding diameter when the movable side pulley half body 38 is away from the fixed side pulley half body 37 by the preset distance). Further, the supply port N2 may be covered by the movable side pulley half body 38 when a winding diameter of the endless member 32 with respect to the driven pulley 31 is maximum. Because the supply port N2 of the lubricating oil passage 47 is formed in the driven shaft 36, oil supplied to the endless member 32 via the supply port N2 is sprayed mainly toward an inner circumferential surface side of the endless member 32.

The flow control valve 48 is a valve provided between the pulley pressure supply oil passage 45 and the lubricating oil passage 47 and operates according to pulley pressure. The flow control valve 48 controls a flow rate (lubrication flow rate) of oil supplied as a lubricating oil to the endless member 32 according to pulley pressure. The flow control valve 48 has a function as a lubrication flow rate control valve 48A that operates when pulley pressure of the driven pulley 31 is lower than preset specified pulley pressure and a function as a release valve 48B that operates when pulley pressure of the driven pulley 31 reaches the preset specified pulley pressure (equal to or higher than the specified pulley pressure). The flow control valve 48 has a similar configuration to that of the flow control valve 43 provided in the driving pulley 30 and is disposed on the side opposite to the flow control valve 43 in the axial direction. The flow control valve 48 includes a case 48a, a first spool 48b, a second spool 48c, first springs 48d, and second springs 48e.

The case 48a corresponds to the case 43a of the flow control valve 43. The case 48a is a housing of the flow control valve 48 having substantially a cylindrical shape. In the case 48a, an inflow port 48h from which oil flows in, a first port 48f and a second port 48g from which oil flows out are formed. The inflow port 48h corresponds to the inflow port 43h of the flow control valve 43. The inflow port 48h is formed on one end surface of the case 48a in the axial direction.

The first port 48f corresponds to the first port 43f of the flow control valve 43. The first port 48f is formed near the center of the case 48a in the axial direction. The first port 48f is a through hole formed to communicate with a hollow portion inside the case 48a and an outer side surface of the case 48a. The first port 48f communicates with the lubricating oil passage 47 outside the case 48a.

The second port 48g corresponds to the second port 43g of the flow control valve 43. The second port 48g is formed at a position farther from the inflow port 48*h* of the case 48*a* in the axial direction than from the first port 48*f*. The second port 48*g* is a through hole formed to communicate with a hollow portion inside the case 48*a* and an outer side surface of the case 48*a*. The second port 48*g* communicates with the lubricating oil passage 47 outside the case 48*a*.

The first spool 48*b* corresponds to the first spool 43*b* of the flow control valve 43. The first spool 48*b* is a member disposed inside the case 48*a* and opens and closes the first port 48*f* according to port pressure. The first spool 48*b* is biased to the inflow port 48*h* side by the first springs 48*d* corresponding to the first springs 43*d* of the flow control valve 43. The opening and closing operations of the first port 48*f* by the first spool 48*b* when the pulley pressure is low, medium, and high are similar to those of the flow control valve 43 in the oil supply mechanism M1 of the driving pulley 30. Thus, the flow control valve 48 functions as the lubrication flow rate control valve 48A when the pulley pressure of the driven pulley 31 is lower than the preset specified pulley pressure.

The second spool 48*c* corresponds to the second spool 43*c* of the flow control valve 43. The second spool 48*c* is a member disposed inside the case 48*a* and opens and closes the second port 48*g* according to port pressure. The second spool 48*c* is biased to the inflow port 48*h* side by the second springs 48*e* corresponding to the second springs 43*e* of the flow control valve 43. The opening and closing operations of the second port 48*g* by the second spool 48*c* when the pulley pressure is low, medium, and high are similar to those of the flow control valve 43 in the oil supply mechanism M1 of the driving pulley 30. In this manner, the flow control valve 48 functions as the release valve 48B when the pulley pressure of the driven pulley 31 reaches the preset specified pulley pressure.

Pressure-flow rate characteristics of the flow control valve 48 are similar to the pressure-flow rate characteristics of the flow control valve 43 in the oil supply mechanism M1 of the driving pulley 30. In other words, the flow control valve 48 has the pressure-flow rate characteristics shown in FIG. 6. The pulley pressure is specified, for example, according to a control map based on a target value of a drive force from the drive source and a target value of a gear ratio. Further, the pressure-flow rate characteristics of the flow control valve 48 are may be set to be different from the pressure-flow rate characteristics of the flow control valve 43 in the oil supply mechanism M1 of the driving pulley 30.

[Actions and Effects]

As described above, the continuously variable transmission 100 is a continuously variable transmission 100 including the driving pulley 30, the driven pulley 31, and the endless member 32 wound around the driving pulley 30 and the driven pulley 31, in which the driving pulley 30 has the drive shaft 33, the fixed side pulley half body 34 fixed to the drive shaft 33, and the movable side pulley half body 35 that can move forward and backward to and from the fixed side pulley half body 34 in the extending direction of the drive shaft 33, the driven pulley 31 has the driven shaft 36, the fixed side pulley half body 37 fixed to the driven shaft 36, and the movable side pulley half body 38 that can move forward and backward to and from the fixed side pulley half body 37 in the extending direction of the driven shaft 36, a gear ratio is changed by changing the groove widths between the fixed side pulley half bodies 34 and 37 and the movable side pulley half bodies 35 and 38 in each of the driving pulley 30 and the driven pulley 31 using pulley pressure, and at least any of the drive shaft 33 of the driving pulley 30 and the driven shaft 36 of the driven pulley 31 includes the pulley pressure supply oil passage 40 or 45 for supplying pulley pressure to the movable side pulley half body 35 or 38, lubricating oil passage 42 or 47 provided on a downstream of the pulley pressure supply oil passage 40 or 45 to supply oil as a lubricating oil to the endless member 32, and the flow control valve 43 or 48 that is provided between the pulley pressure supply oil passage 40 or 45 and the lubricating oil passage 42 or 47 and operates according to pulley pressure.

According to the continuously variable transmission 100, oil supplying pulley pressure for operating the movable side pulley half body 35 or 38 circulates on the pulley pressure supply oil passage 40 or 45 in at least any of the drive shaft 33 of the driving pulley 30 and the driven shaft 36 of the driven pulley 31. The oil circulating in the pulley pressure supply oil passage 40 or 45 is supplied as a lubricating oil to the endless member 32 via the flow control valve 43 or 48 that operates according to the pulley pressure on the downstream side. In other words, in the continuously variable transmission 100, the oil passage in which oil to be supplied to the endless member 32 circulates is provided on the downstream side of the oil passage in which oil for causing the driving pulley 30 and the driven pulley 31 to operate circulates (i.e., configured with an oil passage of the same system), and is not configured with an oil passage of a separate system. For this reason, when the flow rate or pressure of oil to the pulley side increases, the flow rate or pressure of oil to the endless member 32 side can simultaneously increases. Therefore, the continuously variable transmission 100 with a simple configuration can curb a decrease in a flow rate or pressure of oil toward the endless member 32 even when a flow rate or pressure of oil toward the pulley side increases.

In the continuously variable transmission 100, when the pulley pressure of the driving pulley 30 or the driven pulley 31 provided with the flow control valve 43 or 48 reaches a preset specified pulley pressure, the flow control valve 43 or 48 may emit oil supplied to the movable side pulley half body 35 or 38. According to this configuration, it is possible to stop an overshoot phenomenon in which pulley pressure becomes excessively high from occurring even when a shift speed increases for example. As a result, it is possible to stop insufficient supply of the lubricating oil to the endless member 32 caused by the overshoot phenomenon and excessive mechanical input to the constituent member of the continuously variable transmission 100.

In the continuously variable transmission 100, the lubricating oil passages 42 and 47 have the supply ports N1 and N2 formed to supply oil to the endless member 32 from the lubricating oil passages 42 and 47, and the supply ports N1 and N2 may be closed by the movable side pulley half body 35 or 38 of the driving pulley 30 or the driven pulley 31 when the winding diameter of the endless member 32 with respect to the driving pulley 30 or the driven pulley 31 is greater than a preset specified winding diameter. Generally, when the winding diameter of the endless member 32 around the pulley is small, a required flow rate of the lubricating oil to the endless member 32 is more likely to increase than when the winding diameter of the endless member 32 around the pulley is large. In addition, when the winding diameter of the endless member 32 around the pulley is large, the endless member 32 moves away from the supply port N1 or N2 of the lubricating oil passage 42 or 47 provided in the drive shaft 33 or the driven shaft 36 of the pulley, thus the lubricating oil is less likely to reach the endless member 32 from the supply port N1 and N2, and thus the efficiency in supply of the lubricating oil deteriorates. For this reason, in the continuously variable transmission 100, the supply port N1 or N2 is opened to supply the lubricating oil to the endless member 32 when the winding diameter of the endless member 32 around the pulley is smaller than the preset specified winding diameter, and the supply port N1 or N2 is closed to reduce the usage amount of the lubricating oil when the winding diameter of the endless member 32 around the pulley is greater than the preset specified winding diameter. In addition, the continuously variable transmission 100 can have a simpler structure because the supply ports N1 and N2 are opened and closed using the existing movable side pulley half bodies 35 and 38 without adding a new constituent component, and further an increase in size and cost of the apparatus can be curbed.

[Modified Example]

The above-described embodiment can be implemented in various modes with modifications or alterations based on knowledge of a person skilled in the art.

In the above-described embodiment, for example, the continuously variable transmission 100 includes both the oil supply mechanism M1 provided in the driving pulley 30 and the oil supply mechanism M2 provided in the driven pulley 31. However, the continuously variable transmission 100 may not include both the oil supply mechanism M1 and the oil supply mechanism M2, and may include at least any of the oil supply mechanism M1 and the oil supply mechanism M2.

In addition, in the above-described embodiment, the flow control valve 43 functions as the release valve 43B when the pulley pressure of the driving pulley 30 reaches the preset specified pulley pressure. However, the flow control valve 43 may not function as the release valve 43B. Likewise, the flow control valve 48 functions as the release valve 48B when the pulley pressure of the driven pulley 31 reaches the preset specified pulley pressure. However, the flow control valve 48 may not function as the release valve 43B.

In addition, in the above-described embodiment, the flow control valve 43 and the flow control valve 48 have a similar configuration except that they are disposed to the side opposite to each other in the axial direction. However, the flow control valve 43 and the flow control valve 48 may have different configurations.

What is claimed is:

1. A continuously variable transmission, comprising:
   a driving pulley;
   a driven pulley; and
   an endless member wound around the driving pulley and the driven pulley,
   each of the driving pulley and the driven pulley having a shaft, a fixed side pulley half body fixed to the shaft, and a movable side pulley half body that can move forward and backward with respect to the fixed side pulley half body in the extending direction of the shaft, and
   a gear ratio being changed by using pulley pressure in each of the driving pulley and the driven pulley to change a groove width between the fixed side pulley half body and the movable side pulley half body,
   wherein at least any of the shaft of the driving pulley and the shaft of the driven pulley includes:
   a pulley pressure supply oil passage for supplying the pulley pressure to the movable side pulley half body,
   a lubricating oil passage provided on a downstream of the pulley pressure supply oil passage to supply oil as a lubricating oil to the endless member, and
   a flow control valve that is provided between the pulley pressure supply oil passage and the lubricating oil passage and operates according to pulley pressure.

2. The continuously variable transmission according to claim 1,
   wherein the flow control valve emits oil supplied to the movable side pulley half body when the pulley pressure of the driving pulley or the driven pulley provided with the flow control valve reaches a preset specified pulley pressure.

3. The continuously variable transmission according to claim 1,
   wherein the lubricating oil passage has a supply port formed to supply oil to the endless member from the lubricating oil passage, and
   the supply port may be closed by the movable side pulley half body of the driving pulley or the driven pulley when a winding diameter of the endless member with respect to the driving pulley or the driven pulley is greater than a preset specified winding diameter.

4. The continuously variable transmission according to claim 2,
   wherein the lubricating oil passage has a supply port formed to supply oil to the endless member from the lubricating oil passage, and
   the supply port may be closed by the movable side pulley half body of the driving pulley or the driven pulley when a winding diameter of the endless member with respect to the driving pulley or the driven pulley is greater than a preset specified winding diameter.

* * * * *